United States Patent
Luko et al.

(10) Patent No.: US 11,924,357 B2
(45) Date of Patent: Mar. 5, 2024

(54) METHODS AND APPARATUS FOR CRYPTOGRAPHIC SIGNATURE GENERATION

(71) Applicant: Arm Limited, Cambridge (GB)

(72) Inventors: Einat Luko, Herzliya (IL); Jeremy Patrick Dubeuf, Antibes (FR)

(73) Assignee: Arm Limited, Cambridge (GB)

(*) Notice: Subject to any disclaimer, the term of this patent is extended or adjusted under 35 U.S.C. 154(b) by 175 days.

(21) Appl. No.: 17/655,235

(22) Filed: Mar. 17, 2022

(65) Prior Publication Data

US 2023/0135566 A1 May 4, 2023

(30) Foreign Application Priority Data

Oct. 29, 2021 (EP) .................... 21306528

(51) Int. Cl.
*H04L 9/32* (2006.01)
*H04L 9/08* (2006.01)

(52) U.S. Cl.
CPC .......... *H04L 9/3252* (2013.01); *H04L 9/0869* (2013.01); *H04L 9/3257* (2013.01)

(58) Field of Classification Search
CPC ... H04L 9/3252; H04L 9/0869; H04L 9/3257; H04L 9/32; H04L 9/08
See application file for complete search history.

(56) References Cited

U.S. PATENT DOCUMENTS

2019/0019366 A1* 1/2019 Chepel ................. H04L 9/3218
2023/0085569 A1* 3/2023 Li ......................... G06F 9/3001
380/28

* cited by examiner

Primary Examiner — Quazi Farooqui
(74) Attorney, Agent, or Firm — NIXON & VANDERHYE P.C.

(57) ABSTRACT

A method of generating a digital signature. The method comprises calculating a first random number and, based on second and third random numbers, first and second modified versions thereof. A curve point on an elliptic curve is determined based on a base point and the first modified version. A first signature part is calculated based on the curve point. Based on the second and third random numbers, the modified versions of the first random number, data to be signed, the first signature part, and a private key, a second signature part and a check value for the second signature part are calculated. The second signature part is compared with the check value for the second signature part and, responsive to the check value for the second signature part matching the second signature part, a cryptographic signature is output comprising the first signature part and the second signature part.

20 Claims, 4 Drawing Sheets

METHODS AND APPARATUS FOR CRYPTOGRAPHIC SIGNATURE GENERATION

CROSS-REFERENCE TO RELATED APPLICATIONS

This application claims priority pursuant to 35 U.S.C. 119(a) to European Patent Application No. 21306528.7, filed Oct. 29, 2021, which application is incorporated herein by reference in its entirety.

BACKGROUND

The present technique relates to the field of cryptographic techniques, and more specifically to signature generation based on elliptic curve cryptography.

Elliptic curve cryptography is a family of cryptographic techniques for performing public key cryptography based on the algebraic structure of elliptic curves. Such techniques can be used for generating cryptographic signatures. An example is the Elliptic Curve Digital Signature Algorithm (ECDSA), which is a variant of the Digital Signature Algorithm (DSA) that uses elliptic curve cryptography.

Elliptic curve cryptography generally provides relatively strong cryptographic performance. For example, ECDSA can provide an equivalent level of protection with a significantly smaller private key, and correspondingly computational efficiency, compared with a DSA implementation which does not use elliptic curves.

The theoretical mathematical strength of elliptic curve cryptographic techniques is thus relatively high, compared with alternatives. However, elliptic curve cryptography implementations can still be vulnerable to side channel and fault injection attacks. There is thus a desire for elliptic curve cryptography techniques with improved resistance to attacks, and consequential improved security.

SUMMARY

At least some examples provide a method comprising:
receiving data to be cryptographically signed;
determining a base point on an elliptic curve;
determining a private key
generating a first random number, a second random number, and a third random number, each of the first, second and third random numbers having a value within a predefined range
calculating, based on the second random number, a first modified version of the first random number;
determining, based on the first random number and the base point, a curve point on the elliptic curve
calculating, based on the curve point, a first signature part;
calculating, based on the third random number, a second modified version of the first random number
calculating, based on the second random number, the first modified version of the first random number, the data, and the private key, a second signature part;
calculating, based on the third random number, the second modified version of the first random number, the data, and the private key, a check value for the second signature part;
comparing the second signature part with the check value for the second signature part; and
responsive to the check value for the second signature part matching the second signature part, outputting a cryptographic signature comprising the first signature part and the second signature part.

Further aspects provide a computer-readable medium comprising instructions which, when executed by one or more processors, cause said one or more processors to perform the aforementioned method.

Further examples provide an apparatus comprising:
interface circuitry to receive data to be cryptographically signed;
random number generation circuitry to generate a first random number, a second random number, and a third random number, each of the first, second and third random numbers having a value within a predefined range; and
signature generation circuitry to:
determine a base point on an elliptic curve;
retrieve a private key
calculate, based on the second random number, a first modified version of the first random number;
calculate, based on the third random number, a second modified version of the first random number
determine, based on the first random number and the base point, a curve point on the elliptic curve
calculate, based on the curve point, a first signature part;
calculate, based on the second random number, the first modified version of the first random number, the data, and the private key, a second signature part;
calculate, based on the third random number, the second modified version of the first random number, the data, and the private key, a check value for the second signature part;
compare the second signature part with the check value for the second signature part; and
responsive to the check value for the second signature part matching the second signature part, output a cryptographic signature comprising the first signature part and the second signature part.

Further aspects, features and advantages of the present technique will be apparent from the following description of examples, which is to be read in conjunction with the accompanying drawings.

DETAILED DESCRIPTION OF THE INVENTION

A signature generation method according to an example of the present disclosure will now be described. The method may be performed by dedicated hardware such as cryptographic circuitry, or by general-purpose hardware such as a central processing unit or a graphics processing unit.

Data, which is to be cryptographically signed, is received. The data may be received from another hardware component, or from another logical function of the same hardware component. As an example, a processor may produce said data, and then either perform the present method itself, or transmit the data to dedicated cryptographic circuitry which performs the present method.

Details of an elliptic curve are determined. Specifically, a base point on the elliptic curve is determined. This may for example comprise agreeing curve parameters, such as an identification of the curve (e.g. an elliptic curve equation), the base point, and/or an order of the base point, with an intended recipient of the signed data. Alternatively or additionally, the base point and other parameters may be determined unilaterally by the entity performing the method, and publicised so as to be accessible to recipients of the signed data. This determination may comprise retrieving pre-generated elliptic curve details from a storage.

A private key is determined. This determination may for example comprise retrieving a previously generated private key from a storage. Alternatively, the private key may be generated from scratch. The private key is kept private, and is not made public.

A first random number, a second random number, and a third random number are generated. These may be generated as cryptographically secure random integers. Each of the generated random numbers has a value within a predefined range. The predefined range may for example be based on the group order of the base point, for example the range [1, n−1] where n is the group order of the aforementioned base point.

Based on the second random number, a first modified version of the first random number is then calculated. This may be calculated as a multiplication, modulo the group order of the base point, of the first random number and the second random number.

Based on the first random number and the base point, a curve point on the elliptic curve is determined. The curve point may be determined by performing an elliptic curve point multiplication of the first random number and the base point.

A first signature part is then determined, based on the curve point. For example, the first signature part may be calculated as a co-ordinate, such as the x co-ordinate, of the curve point, modulo the group order of the base point. The first signature part may be rejected if it has a value of zero, thereby avoiding the reduced security that could arise from a first signature part of zero. If the first signature part is rejected, the first, second and third random numbers may be re-generated, and the subsequent method steps repeated.

Based on the third random number, a second modified version of the first random number is calculated. This may for example be calculated as a multiplication, modulo the group order of the base point, of the first random number and the third random number.

A second signature part is then calculated, based on the second random number, the first modified version of the first random number, the data, the first signature part, and the private key. An example of such a calculation is described in more detail below. The second signature part may be rejected if it has a value of zero, thereby avoiding the reduced security that could arise from a second signature part of zero. If the second signature part is rejected, the first, second and third random numbers may be re-generated, and the subsequent method steps repeated. Because the generation of the second signature part uses a modified version of the first random number as opposed to the first random number itself, the generation does expose the first random number to side channel attacks, compared with comparative systems in which a single (secret) ephemeral key is used instead of the presently described modified random number. For example, this is partially because the present method does not perform operations based on a secret ephemeral key (such as the first random number), and does not combine a secret value with a publicly output value (such as the first signature part). This is described in more detail below.

A check value for the second signature part is determined, based on the third random number, the second modified version of the first random number, the data, the first signature part, and the private key. An example of such a calculation is described in more detail below. The calculation may be such that, in the absence of malicious interference with the method, the check value corresponds in some way to the second signature part. For example, the calculation of the check value may be a redundant calculation of the second signature part such that, in the absence of malicious activity, the second signature part is expected to be equal to the check value. In particular, the second signature part and the check value may differ if a fault has been injected on the private key during performance of the present method. Similarly, this ensures that the first and second modified versions of the first random number were based on the same first random number, and that the first random number was not tampered with. This provides improved security compared with comparative systems in which the same single ephemeral key is used throughout, in which such tampering could allow fault injection and recovery of the secret ephemeral key and/or private key via a side channel attack.

The second signature part is then compared with the check value for the second signature part. Responsive to the check value matching (e.g. being equal to) the second signature part, it may be assumed that the generation of the second signature part has not been tampered with. In this case, a cryptographic signature comprising the first signature part and the second signature part is output. Conversely, if the check value does not match the second signature part, mitigation actions may be performed. An example mitigation action is that the outputting of the cryptographic signature is blocked, to avoid outputting an insecure signature. Alternatively or additionally, an attack detection warning may be output, to warn a user of an attempted attack.

Significantly improved protection against side channel attempts is thus provided, when compared against comparative systems which do not implement examples of the present disclosure. Furthermore, because no additional elliptic curve multiplication is performed, computational complexity is not significantly increased.

In an example, the order of the following steps is varied (for example being changed each time the method is performed, such that the steps are in a different order for the generation of a subsequent signature):

the determining of the first modified version of the first random number;
the determining of the second modified version of the first random number;
the calculating of the second signature part; and
the calculating of the check value for the second signature part.

Varying the order may comprise randomising the order. Constraints may be applied to this randomising, to ensure that all inputs to a given step are available before that step is performed. Specifically, constraints may be applied such that:

the calculating the second signature part is subsequent to the determining the first modified version of the first random number; and
the calculating the check value for the second signature part is subsequent to the determining the second modified version of the first random number.

In some examples, the second signature part and the check value are calculated based on data indicative of the data, such as a hash of the data. This provides a computationally efficient way for the second signature part and the check value to be based on the data.

Examples of the present disclosure will now be described with reference to the drawings.

Figure 1:
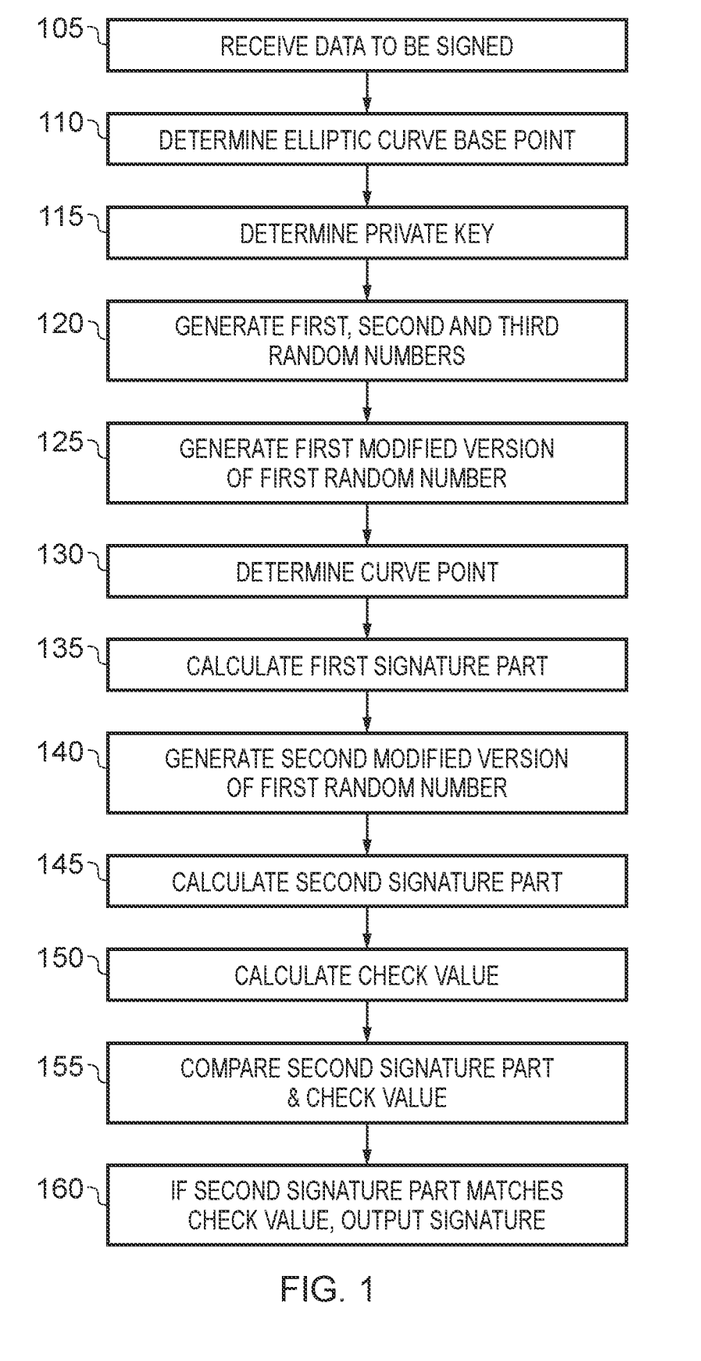
FIG. 1 schematically depicts a method according to an example.

FIG. 1 schematically shows a method according to an example of the present disclosure.

At block 105, data is received. The data is to be cryptographically signed.

At block 110, a base point on an elliptic curve is determined.

At block 115, a private key is determined.

At block 120, first, second and third random numbers are generated. Each generated random number has a value within a predefined range.

At block 125, a first modified version of the first random number is produced, based on the second random number.

At block 130, a curve point on the elliptic curve is determined based on the first random number and the base point.

At block 135, a first signature part is calculated based on the curve point.

At block 140, a second modified version of the first random number is produced, based on the third random number.

At block 145, a second signature part is calculated, based on the second random number, the first modified version of the first random number, the data, the first signature part, and the private key.

At block 150, a check value for the second signature part is calculated, based on the third random number, the second modified version of the first random number, the data, the first signature part, and the private key.

At block 155, the second signature part and the check value are compared.

Finally, at block 160, if the second signature part matches the check value for the second signature part, a signature is output. The outputted signature comprises the first signature part and the second signature part.

Figure 2:
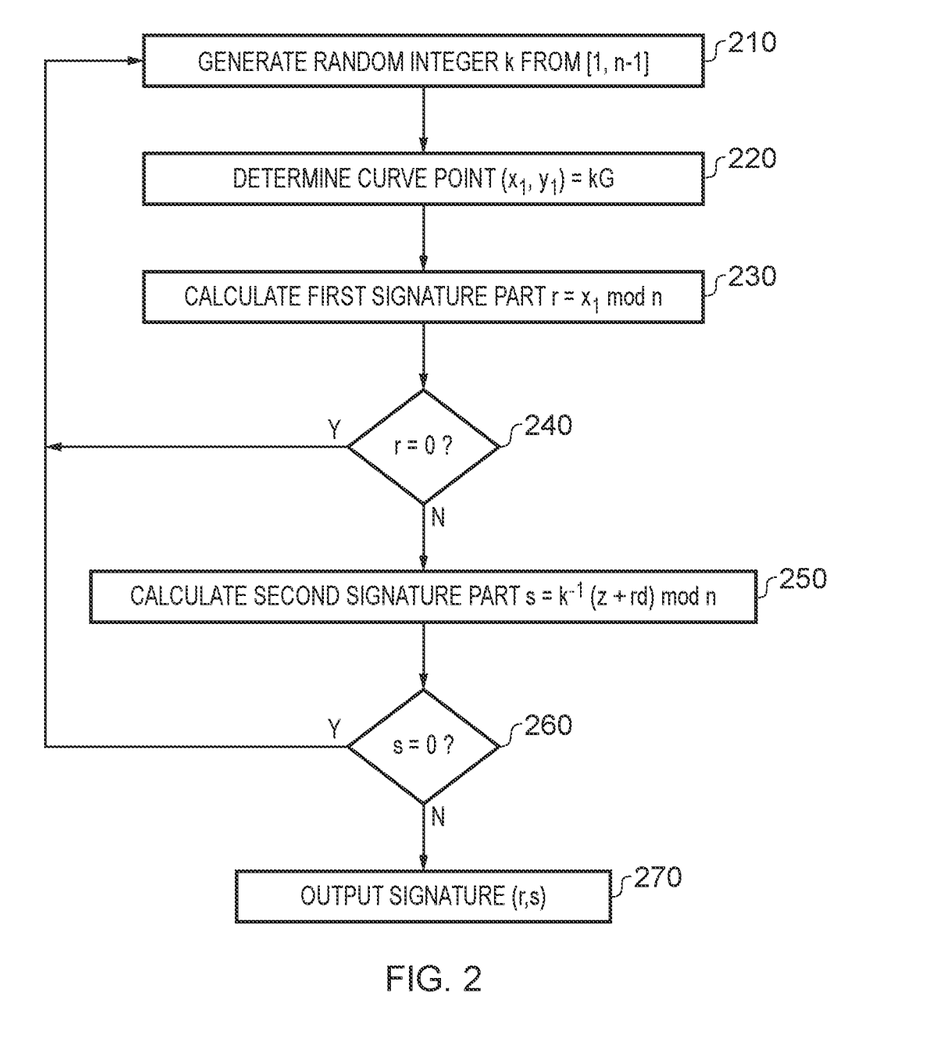
FIG. 2 depicts a method according to a comparative example.

FIG. 2 depicts a method according to a comparative example, which does not implement aspects of the present disclosure. This comparative example is a method for generating a digital signature based on elliptic curve cryptography, for example based on the Elliptic Curve Digital Signature Algorithm (ECDSA).

Prior to the method being performed, the entity performing the method determines parameters of an elliptic curve to be used, for example by agreeing these parameters with a recipient of data which is to be signed. The parameters include the curve itself (e.g. defined by an equation), a base point G on the curve, and an integer order n of the curve (such that n×G=0, where 0 is the identity element).

At block 210, a random integer k is generated, within the range from 1 to n−1. This random integer functions as an ephemeral key.

At block 220, a curve point $(x_1, x_2)$ is determined by performing an elliptic curve point multiplication of the base point G by k.

At block 230, a first signature part r is calculated as:

$r = x_1 \mod n.$

At block 240, it is determined whether r is zero. If so, the method restarts with a newly generated k, to avoid the poor security that would arise from a signature value of zero.

Otherwise, flow proceeds to block 250, where a second signature part s is calculated according to:

$s = k^{-1}(z + rd) \mod n,$ where d is a private key assigned to the entity performing the method, and z is the leftmost Ln bits of a hash of the data to be signed, where Ln is the bit length of n.

At block 260, it is determined whether s is zero. If so, the method restarts with a newly generated k. Otherwise, flow proceeds to block 270, where a signature comprising the pair (r, s) is output.

The above-described comparative example provides a relatively mathematically secure method of encryption. However, it is vulnerable to side-channel attacks, i.e. attacks based on the system performing the method as opposed to weaknesses in the method itself. For example, such attacks may be based on observing the time and/or processing resources incurred in performing the above-described method steps. Such attacks may also be based on injecting faults to change the values of the above-described parameters. Four examples of such vulnerabilities will now be described.

Firstly, block 250 includes a calculation involving both a secret d and a known value r (r is considered "known" because it will be output as part of the signature). This combination of secret and known can cause side channel leakage that can be exploited for reconstructing the private key by an attacker.

Secondly, the calculation at block 250 also involves a modular inverse calculation on the ephemeral key k. This can cause side channel leakage that can be exploited for identifying k, which can in turn allow reconstruction of the private key d by an attacker.

Thirdly, a fault could be injected on the private key d during (or prior to) the calculation in block 250. If the d value in block 250 is different from the value that was initially generated (i.e. during key generation, prior to performing the method of FIG. 2), information on the private key d can be exposed.

Fourthly, the method of FIG. 2 does not allow any detection of whether the same value of the ephemeral key k was used in block 220 and block 250. If a fault were injected that changed the value of k during or prior to block 250, but after block 220, k could potentially be recovered by an attacker, which could in turn lead to recovery of the private key d.

Thus, the method of FIG. 2 has various vulnerabilities, in particular which could allow the extraction of secret data such as the private key d.

Figure 3:
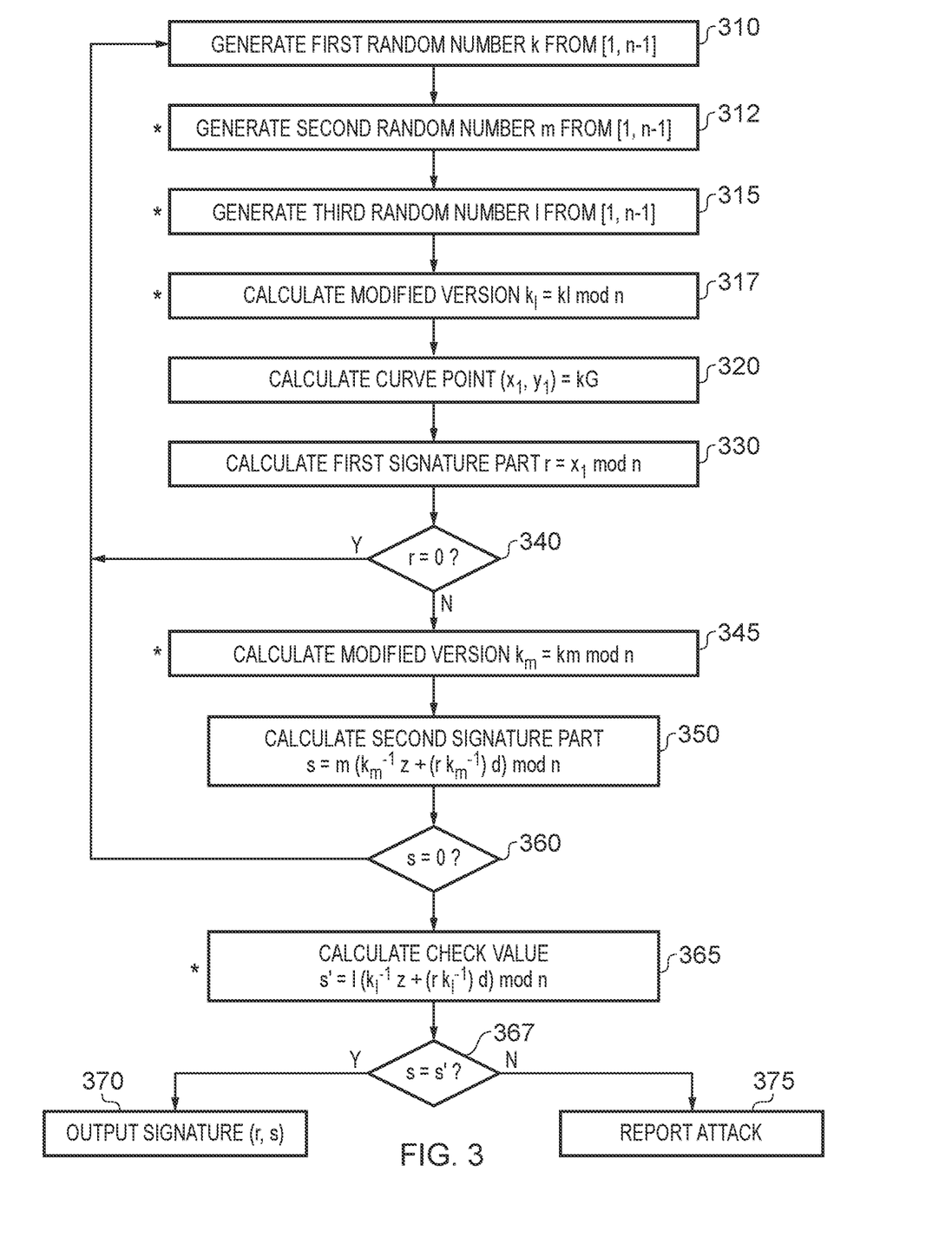
FIG. 3 depicts a method according to an example.

FIG. 3 illustrates a method, according to the present disclosure, which allows generation of a signature corresponding to that of FIG. 2, without having the aforementioned vulnerabilities. Blocks with a reference numeral that is a multiple of 10 are somewhat analogous to the similarly numbered blocks of FIG. 2 (e.g. block 310 is similar to block 210). Other blocks, which are marked with stars, have no analogue in FIG. 2. The method may be performed as part of the method of FIG. 1.

The method ultimately provides a digital signature, associated with data which is to be signed. Some or all of the method may be performed by dedicated signature generation circuitry. Alternatively or additionally, some or all of the method may be performed by general-purpose processing circuitry such as a central processing unit or graphics processing unit.

As for FIG. 2, prior to the method being performed, the entity performing the method determines parameters of an elliptic curve to be used, for example by agreeing these parameters with a recipient of data which is to be signed. The parameters include the curve itself (e.g. defined by an equation), a base point G on the curve, and an integer order n of the curve (such that n×G=0, where 0 is the identity element).

At block 310, a cryptographically secure random number k is generated within the range 1 to n−1, for example by software or by a hardware random number generator unit. This value k serves as an ephemeral key for the method.

At blocks 312 and 315, a second cryptographically secure random number m and a third cryptographically secure random number l are generated, both within the range 1 to n−1.

At block 317, a modified version of k is determined as $k_l = k_l$ mod n. $k_l$ is thus a version of k which has been "blinded" by l.

At block 320, a curve point $(x_1, x_2)$ is determined by performing an elliptic curve point multiplication of the base point G by k.

At block 330, a first signature part r is calculated as $r = x_1$ mod n.

At block 340, it is determined whether r is zero. If so, the method restarts with a newly generated k, to avoid the poor security that would arise from a signature value of zero.

Otherwise, flow proceeds to block 345, where a second modified version of k is calculated according as $k_m = k_m$ mod n. $k_m$ is thus a version of k which has been "blinded" by m.

At block 350, a second signature part s is calculated according to:

$$s = m(k_m^{-1} z + (rk_m^{-1})d) \bmod n.$$

As with FIG. 2, d is a private key assigned to the entity performing the method, and z is the leftmost Ln bits of a hash of the data to be signed, where Ln is the bit length of n. The equation for s is thus somewhat similar to that of FIG. 2, except that a modified (or "blinded") version of k is used instead of k itself. The multiplication by m effectively undoes this blinding, such that the calculated s is expected to produce the same value that would have been produced in the method of FIG. 2.

At block 360, it is determined whether s is zero. If so, the method restarts with a newly generated k.

Otherwise, flow proceeds to block 365, where a check value for the second signature part s' is calculated according to:

$$s' = l(k_l^{-1} z + (rk_l^{-1})d) \bmod n.$$

The check value s' is thus calculated similarly to the second signature part s, except that k is blinded by l rather than m. As for s, the multiplication by l effectively undoes this blinding, such that s and s' are expected to have the same value.

At block 367, it is determined whether s and s' are equal. If so, a signature comprising the pair (r, s) is output at block 370. The method of FIG. 3 thus produces the same signature as the method of FIG. 2.

However, if s is not equal to s', this is indicative of a malicious attack (as explained below). Thus, in this case, the signature is not output and, instead, an attack is reported at block 375.

The method of FIG. 3 addresses the vulnerabilities of the method of FIG. 2. In turn:

The first vulnerability, i.e. the use of a calculation involving a secret and a known value, is addressed because the calculation in block 350 uses $rk_m^{-1}$, and not r per se. $rk_m^{-1}$ is not a known value for a potential attacker.

The second vulnerability, i.e. the performing of a calculation on the ephemeral key k, is avoided because the calculation in block 350 takes the modular inverse of the blinded value $k_m$, rather than k itself. The underlying ephemeral key k is thus not exposed.

The third vulnerability, i.e. the potential injection of a fault on the private key d, is addressed by way of the redundant calculation of s and s'. If a different value of d is used in blocks 350 and 365, e.g. because of a fault injection, the calculated values of s and s' will detected as different in block 367.

The fourth vulnerability, i.e. the potential injection of a fault on the ephemeral key k, is addressed by way of the calculation of $k_l$ in block 317, and the calculation of $k_m$ in block 345, with the calculation of the first signature part r being between these. Because s is based on $k_m$, and s' is based on $k_l$, any difference in the values of k in blocks 317 and 345 will lead to a difference between s and s', which will in turn be detected in block 367. Tampering with the calculation of $k_m$ and $k_l$ is thus detectable. Tampering with k in blocks 350 and 365 (the calculation of s and s' is practically very difficult, because k is not used directly in these calculations and instead only the blinded values $k_m$ and $k_l$ are used.

The vulnerabilities of FIG. 2 are thus addressed by the method of FIG. 3. The additional steps of FIG. 3 do not significantly add to computational complexity: the most computationally complex aspect of FIG. 3 is the elliptic curve multiplication in block 320, and the method of FIG. 3 does not add any additional such multiplication over what was performed in the comparative example of FIG. 2. Security is thus increased, without significant increase in computational resource usage.

Figure 4:
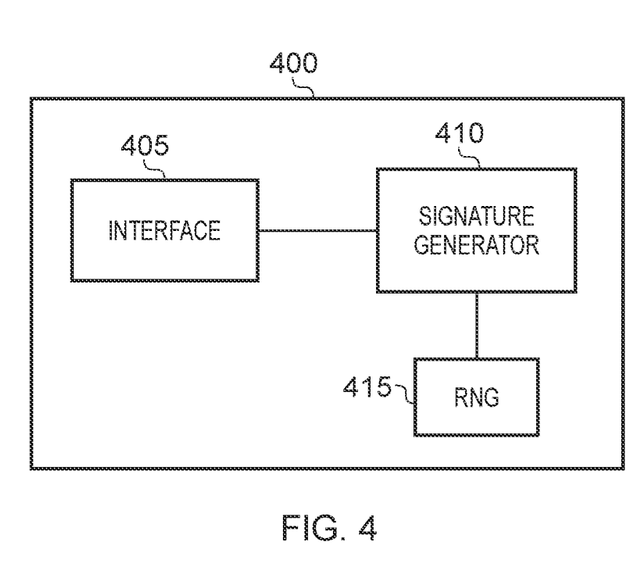
FIG. 4 depicts an apparatus according to an example.

FIG. 4 depicts an apparatus 400 according to an example of the present disclosure. The apparatus 400 may be configured to perform the method of FIG. 1 and/or FIG. 3.

The apparatus 400 comprises an interface 405, a signature generator 410, and a random number generator 415. Any or all of these components may be implemented in dedicated hardware, or as logical units implemented by general-purpose processing circuitry.

The interface 405 is configured to receive data to be cryptographically signed.

The random number generator 415 is configured to generate a first random number, a second random number, and a third random number, each of the first, second and third random numbers having a value within a predefined range.

The signature generation circuitry is configured to:
  determine a base point on an elliptic curve;
  retrieve a private key
  calculate, based on the second random number, a first modified version of the first random number;
  calculate, based on the third random number, a second modified version of the first random number
  determine, based on the first random number and the base point, a curve point on the elliptic curve
  calculate, based on the curve point, a first signature part;
  calculate, based on the second random number, the first modified version of the first random number, the data, the first signature part, and the private key, a second signature part;
  calculate, based on the third random number, the second modified version of the first random number, the data, the first signature part, and the private key, a check value for the second signature part;
  compare the second signature part with the check value for the second signature part; and
  responsive to the check value matching the second signature part, output a cryptographic signature comprising the first signature part and the second signature part.

The apparatus 400 is thus configured to perform the method of FIG. 1.

Apparatuses and methods are thus provided for improving the security of elliptic curve signature generation.

From the above description it will be seen that the techniques described herein provides a number of significant benefits. In particular, the aforementioned increase in security is achieved without a significant increase in processing resource usage.

In the present application, the words "configured to . . . " are used to mean that an element of an apparatus has a configuration able to carry out the defined operation. In this context, a "configuration" means an arrangement or manner of interconnection of hardware or software. For example, the apparatus may have dedicated hardware which provides the defined operation, or a processor or other processing device may be programmed to perform the function. "Configured to" does not imply that the apparatus element needs to be changed in any way in order to provide the defined operation.

Although illustrative embodiments of the invention have been described in detail herein with reference to the accompanying drawings, it is to be understood that the invention is not limited to those precise embodiments, and that various changes and modifications can be effected therein by one skilled in the art without departing from the scope of the invention as defined by the appended claims.

What we claim is:

1. A method comprising:
receiving data to be cryptographically signed;
determining a base point on an elliptic curve;
determining a private key
generating a first random number, a second random number, and a third random number, each of the first, second and third random numbers having a value within a predefined range
calculating, based on the second random number, a first modified version of the first random number;
determining, based on the first random number and the base point, a curve point on the elliptic curve;
calculating, based on the curve point, a first signature part;
calculating, based on the third random number, a second modified version of the first random number
calculating, based on the second random number, the first modified version of the first random number, the data, the first signature part, and the private key, a second signature part;
calculating, based on the third random number, the second modified version of the first random number, the data, the first signature part, and the private key, a check value for the second signature part;
comparing the second signature part with the check value for the second signature part;
responsive to the check value for the second signature part matching the second signature part, outputting a cryptographic signature comprising the first signature part and the second signature part.

2. The method according to claim 1, wherein the predefined range is based on a group order of the base point.

3. The method according to claim 2, wherein the predefined range is a range from 1, to 1 subtracted from the group order of the base point.

4. The method according to claim 3, comprising generating the first modified version of the first random number as a multiplication, modulo the group order of the base point, of the first random number and the second random number.

5. The method according to claim 4, wherein:
when:
the second signature part is denoted s;
the second random number is denoted m;
the first modified version of the first random number is denoted $k_m$;
the group order of the base point is denoted n;
the leftmost Ln bits of a hash of the data, where Ln is the bit length of n, is denoted z;
the first signature part is denoted r; and
the private key is denoted d,
the method comprises calculating the second signature part according to:

$$s=m(k_m^{-1}z+(rk_m^{-1})d) \bmod n.$$

6. The method according to claim 2, comprising generating the second modified version of the first random number as a multiplication, modulo the group order of the base point, of the first random number and the third random number.

7. The method according to claim 6, wherein:
when:
the check value for the second signature part is denoted s';
the third random number is denoted $k_l$;
the second modified version of the first random number is denoted $k_l$;
the group order of the base point is denoted n;
the leftmost Ln bits of a hash of the data, where Ln is the bit length of n, is denoted z;
the first signature part is denoted r; and
the private key is denoted d,
the method comprises calculating the check value for the second signature part according to:

$$s'=l(k_l^{-1}z+(rk_l^{-1})d) \bmod n.$$

8. The method according to claim 1, wherein the second signature part matching the check value for the second signature part comprises the second signature part being equal to the check value for the second signature part.

9. The method according to claim 5 comprising, responsive to the second signature part having a value of zero, rejecting the second signature part.

10. The method according to claim 1 comprising, responsive to the check value for the second signature part being unequal to the second signature part, performing at least one of:
blocking the outputting of the cryptographic signature; and
outputting an attack detection warning.

11. The method according to claim 1 comprising varying the order of:
the determining of the first modified version of the first random number;
the determining of the second modified version of the first random number;
the calculating of the second signature part; and
the calculating of the check value for the second signature part.

12. The method according to claim 11, wherein varying the order comprises randomising the order, subsequent to the constraints that:
the calculating the second signature part is subsequent to the determining the first modified version of the first random number; and the calculating the check value for the second signature part is subsequent to the determining the second modified version of the first random number.

13. The method according to claim 1, comprising determining the curve point by performing an elliptic curve point multiplication of the first random number and the base point.

14. The method according to claim 13, comprising calculating the first signature part as a co-ordinate of the curve point, modulo the group order of the base point.

15. The method according to claim 14, wherein the co-ordinate of the curve point is the x co-ordinate of the curve point.

16. The method according to claim 1 comprising, responsive to the first signature part having a value of zero, rejecting the first signature part.

17. The method according to claim 1, comprising agreeing the elliptic curve, the base point, and the order of the base point, with an intended recipient of the data.

18. The method according to claim 1, comprising calculating the second signature part and the check value for the second signature part based on a hash of the data.

19. The computer-readable medium comprising instructions which, when executed by one or more processors, cause said one or more processors to perform the method of claim 1.

20. An apparatus comprising:
interface circuitry to receive data to be cryptographically signed;
random number generation circuitry to generate a first random number, a second random number, and a third random number, each of the first, second and third random numbers having a value within a predefined range; and
signature generation circuitry to:
  determine a base point on an elliptic curve;
  retrieve a private key
  calculate, based on the second random number, a first modified version of the first random number;
  calculate, based on the third random number, a second modified version of the first random number
  determine, based on the first random number and the base point, a curve point on the elliptic curve
  calculate, based on the curve point, a first signature part;
  calculate, based on the second random number, the first modified version of the first random number, the data, the first signature part, and the private key, a second signature part;
  calculate, based on the third random number, the second modified version of the first random number, the data, the first signature part, and the private key, a check value for the second signature part;
  compare the second signature part with the check value for the second signature part; and
  responsive to the check value for the second signature part matching the second signature part, output a cryptographic signature comprising the first signature part and the second signature part.

* * * * *